US008424024B2

(12) United States Patent
Remmert

(10) Patent No.: US 8,424,024 B2
(45) Date of Patent: Apr. 16, 2013

(54) APPLICATION-SPECIFIC SERIAL PORT REDIRECTOR

(75) Inventor: Harald Remmert, Minnetonka, MN (US)

(73) Assignee: Digi International Inc., Minnetonka, MN (US)

( * ) Notice: Subject to any disclaimer, the term of this patent is extended or adjusted under 35 U.S.C. 154(b) by 1025 days.

(21) Appl. No.: 12/411,711

(22) Filed: Mar. 26, 2009

(65) Prior Publication Data

US 2010/0251269 A1 Sep. 30, 2010

(51) Int. Cl.
*G06F 3/00* (2006.01)
*G06F 15/16* (2006.01)

(52) U.S. Cl.
USPC ............ 719/328; 719/313; 719/315; 709/250

(58) Field of Classification Search .................. None
See application file for complete search history.

(56) References Cited

U.S. PATENT DOCUMENTS

| | | | | |
|---|---|---|---|---|
| 6,324,587 | B1 * | 11/2001 | Trenbeath et al. ............ | 719/315 |
| 7,085,814 | B1 * | 8/2006 | Gandhi et al. ................ | 719/328 |
| 8,079,038 | B2 * | 12/2011 | Caron ........................... | 719/313 |
| 2004/0205781 | A1 * | 10/2004 | Hill et al. ...................... | 719/328 |
| 2005/0138432 | A1 * | 6/2005 | Ransom et al. ............... | 713/201 |
| 2005/0149624 | A1 * | 7/2005 | Jakubiec et al. .............. | 709/217 |
| 2005/0150946 | A1 * | 7/2005 | Miodunski et al. ........... | 235/379 |
| 2005/0223393 | A1 * | 10/2005 | Machin et al. ................ | 719/328 |
| 2005/0260989 | A1 * | 11/2005 | Pourtier et al. ........... | 455/435.3 |
| 2006/0212539 | A1 * | 9/2006 | Palevich et al. .............. | 709/217 |
| 2007/0245011 | A1 * | 10/2007 | Kouhsari et al. ............. | 709/223 |
| 2007/0255856 | A1 * | 11/2007 | Reckamp et al. ............. | 709/250 |
| 2008/0276007 | A1 * | 11/2008 | Chitturi et al. ................ | 709/250 |
| 2009/0013092 | A1 * | 1/2009 | Pao et al. ....................... | 709/250 |

OTHER PUBLICATIONS

Definition of device noun from the Oxford Advanced Learner's Dictionary, Oxford University Press, p. 1.*
Takashi Okumura et al., Operating System Support for Network Control, 2002, pp. 1-10.*
Takanori Okuma et al., Development of PPRAM-Link Interface (PLIF) IP Core for High-Speed Inter-SoC Communication, 2001, pp. 1-2.*
Eun-Seon Cho et al., SCA-based Multi-LAN Application Development, 2004, pp. 1-5.*
Serial Port API ver 1.14, 2001, pp. 1-24.*

* cited by examiner

*Primary Examiner* — Andy Ho
(74) *Attorney, Agent, or Firm* — Fogg & Powers LLC

(57) ABSTRACT

A method and system are illustrated to redirect serial device requests from an application on a computer to a plurality of serial devices connected to the computer via a network. The method and system include receiving serial device requests from one or more applications existing on the computer. Each serial device request may be associated with a specific application protocol and directed to one of the plurality of serial devices over the network. The method and system include determining, for a respective serial device request, an application protocol associated with the respective serial device request and forwarding the respective serial device request as a serial redirector message according to the determined application protocol. The method and system include associating the forwarded serial redirector message with a transport protocol. The method and system further include transmitting the serial redirector message over the network as a function of a transport protocol associated with the serial redirector message.

24 Claims, 5 Drawing Sheets

APPLICATION-SPECIFIC SERIAL PORT REDIRECTOR

CROSS REFERENCE TO RELATED APPLICATIONS

The present application is related to U.S. Non-Provisional Pat. No. 6,047,319 entitled "Network Terminal Server with Full API Implementation" that was patented on Apr. 4, 2000, and which is incorporated by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright © 1996-2008 DIGI International. All Rights Reserved.

TECHNICAL FIELD

This document relates generally to systems and methods that redirect serial ports from an application on a computer to a plurality of serial devices connected to the computer via a network.

BACKGROUND

A serial device serves a specific purpose, such as gathering and displaying transaction, video and/or control information from an environment where the serial device is installed. Examples of such serial devices are found in retail data systems (e.g., Point-of-Sale (POS)), medical/healthcare systems and building automation/security systems, etc. Typically, a specific application protocol is used for an application program on a host computer to communicate with such a serial device through standard serial ports such as COM and TTY interfaces depending on participating operating systems. For example, RFC-2217, Modus and DF1 are application protocols widely used in industry for such a purpose. On the other hand, custom-defined protocols, such as the RealPort product marketed by Applicant, may be used. When the serial devices are connected to the host computer over a network, an appropriate transport protocol is used to transmit the serial device request from the application program to its associated serial device over the network. For example, Transmission Control Protocol (TCP), User Datagram Protocol (UDP), Telnet and Secure Sockets Layer (SSL) are transport protocols widely used in the industry for such a purpose.

Existing serial port redirectors are dedicated to one application protocol and one transport protocol pair. For example, Modbus ASCII/RTU serial device requests may be paired with TCP. It would be advantageous to allow application protocols to be dynamically paired with transport protocols as needed. In addition, in the existing serial port redirectors, everything that an application sends to the serial port redirector is sent to the serial device. In many of these scenarios, the control data is unnecessary for operation of at least some of the serial devices. The transfer of unnecessary control data over the network increases network costs, especially when the serial port redirector is used in a wireless network that charges according to the amount of information being transferred over the network.

What is needed is a serial port redirector that supports dynamic transition from one application/transport protocol pair to another application/transport protocol pair. In addition, what is needed is a system and method for limiting transfer of unnecessary control information over a network.

DETAILED DESCRIPTION

In the following detailed description, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Figure 1:
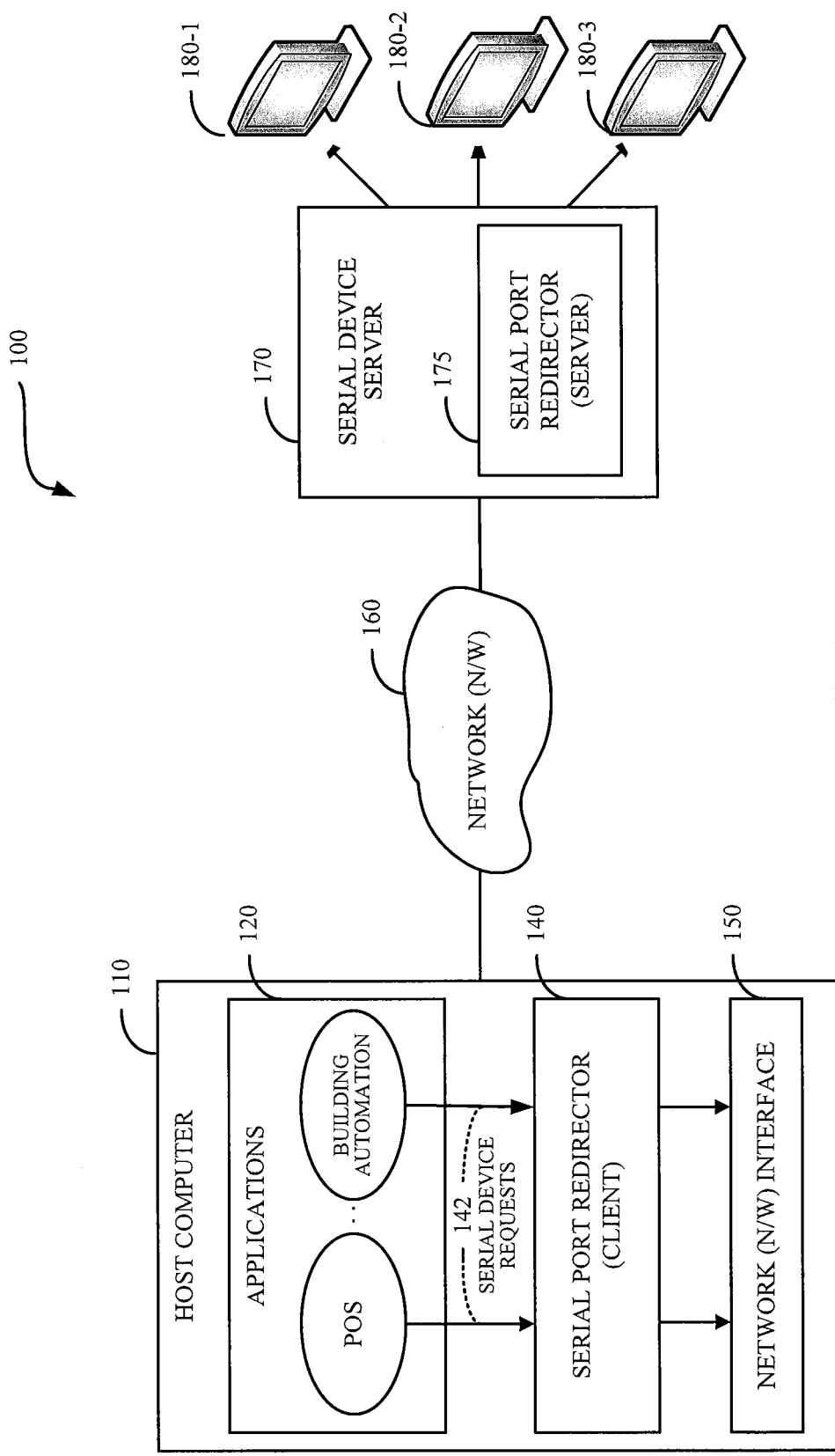
FIG. 1 is a block diagram of a network computing environment using an application protocol-specific serial port redirector in accordance with an example embodiment.

FIG. 1 is a block diagram of a network computing environment 100 using an application protocol-specific serial port redirector in accordance with an example embodiment. Illustrated in FIG. 1 are a host computer 110, a network 160, a serial device server 170 and a plurality of serial devices 180-1, 180-2 and 180-3. The host computer 110 may run one or more applications 120 therein. The one or more applications 120 may be operatively coupled with an application protocol-specific serial port redirector 140. The application protocol-specific serial port redirector 140 may be operatively coupled with a network interface 150. The application protocol-specific serial port redirector 140 may support a plurality of application protocols and a plurality of transport protocols to facilitate transmission of serial device requests from the one or more applications 120 to their respective serial devices 180 via the network 160. The network 160 may be the Internet, Local Area Network (LAN), Wide Area Network (WAN), Personal Area Network (PAN), sensor networks, or any of other suitable networks. In some example embodiments, the serial device requests may be transferred to a serial device server 170. The serial device server 170 may run a serial port redirector server 175. In such cases, one or more of the serial devices 180-1, 180-2, 180-3 may be operatively coupled with the serial device server 170 via corresponding serial communication lines. The serial device requests transferred from the host computer 110 may then be redirected to a corresponding serial device by the serial port redirector server 175. This way, more than one application 120 having different application protocols may communicate with the plurality of serial devices 180-1, 180-2, 180-3 using different transport protocols. More detailed explanation about the serial port redirector 140 is given below using FIGS. 2-6. It is noted that although only a single host computer 110 and a single serial device server 170 are illustrated in FIG. 1, a plurality of host computers and serial device servers may be operatively coupled to one other via the network 160 in some example embodiments.

Figure 2:
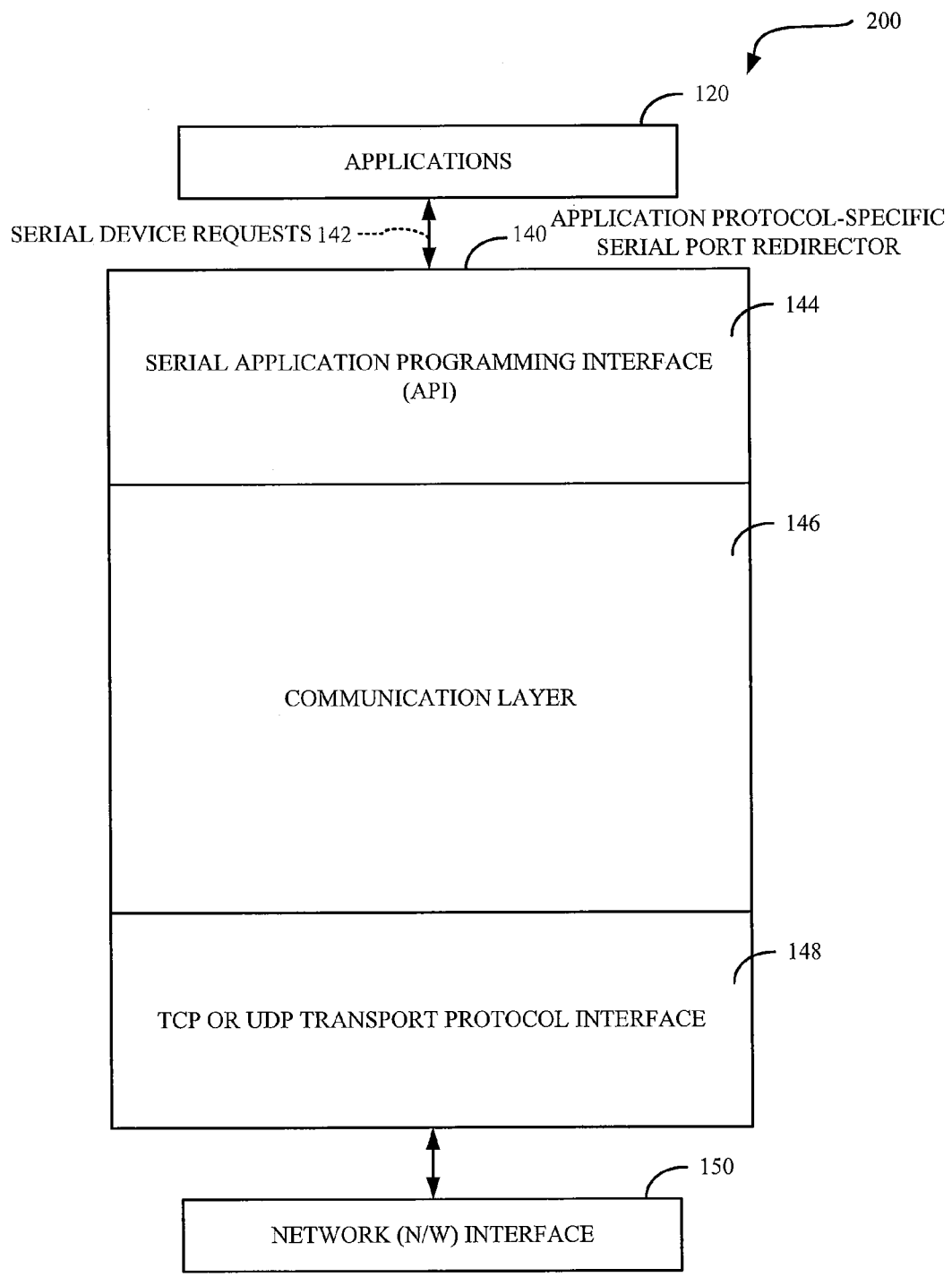
FIG. 2 is a block diagram of an application protocol-specific serial port redirector in accordance with an example embodiment.

FIG. 2 is a detailed block diagram of an application protocol-specific serial port redirector 200 in accordance with an example embodiment. Illustrated in FIG. 2 are one or more applications 120, the application protocol-specific serial port redirector 140 and the network interface 150. One or more of the applications 120 may send a plurality of serial device requests 142 to the application protocol-specific serial port redirector 140 for further transmission to one or more corresponding serial devices 180 (not shown in FIG. 2). The application protocol-specific serial port redirector 140 may comprise a serial application programming interface (API) 144 and a transport protocol interface 148. The serial device requests 142 sent from the applications 120 may be received at the serial application programming interface (API) 144 through an appropriate serial port (not shown in FIG. 2) interface, such as a COM port interface for a Microsoft Windows operating system or a TTY port interface for a Linux operating system. The serial device requests 142 then may be passed to the transport protocol interface 148. The application protocol-specific serial port redirector 140 may further include a communication layer 146. The communication layer 146 may, for example, manipulate (e.g., delete, reduce, consolidate, duplicate, etc.) the serial device requests' control data associated with a given application protocol employed by the application protocol-specific serial port redirector 140 before sending the serial device requests 142 to the transport protocol interface 148. Such manipulation of the control data reduces overhead in traffic over the network 160.

For example, if RFC-2217 is employed for the serial device requests 142, such control data as baud rate (e.g., 9600), data length (e.g., 8 bits), parity bit (e.g., none), stop bits (e.g., 1 stop bit) and DTR (often used to disconnect a call) may be attached to the serial device requests 142. These control data may be deleted, reduced, consolidated as necessary by the communication layer 146. In some example embodiments, the same control data may be duplicated and sent to multiple serial devices. If the manipulation of the control data is done by the communication layer 146, the serial device requests 146 may be passed to the transport protocol interface 148 for further transmission via the network 160 (not shown in FIG. 2) to one or more of the serial devices 180 (not shown in FIG. 2) using a given transport protocol (e.g., either TCP or UDP) supported by the transport protocol interface 180. It is also noted, however, that if the control data is only used for internal communication with any of the applications 120 (e.g., answering a status request message sent by the applications 120), the control data may not be sent to the network 160. In such cases, the control data may not go through the manipulation process.

In some example embodiments, the application protocol-specific serial port redirector 140 may support serial device requests 142 that are associated with two or more application protocols. For example, with Modbus/ASCII, messages are sent in a readable ASCII format. With Modbus/RTU, messages use binary encoding, which reduces the size of each message and with that allows for more data exchange in the same time span. All nodes on a Modbus network may use the same serial transmission mode, which means that a device configured to use Modbus/ASCII cannot understand messages in Modbus/RTU and vice versa. The application protocol-specific serial port redirector 140 may enable two applications 120, one talking Modbus/ASCII, the other talking Modbus/RTU, to talk to a Modbus/RTU serial device 180, by translating Modbus/ASCII message into Modbus/RTU messages before sending them over the network 160 to the serial device.

In some example embodiments, the application protocol-specific serial port redirector 140 may also support two or more transport protocols, such as TCP, UDP, IP, Telnet, SSH, SSL, HTTP or HTTPS, etc. By supporting a plurality of application protocols and a plurality of transport protocols, the application protocol-specific serial port redirector 140 may allow transition from one application/transport protocol pair to another application/transport protocol pair to handle the plurality of serial device requests 142. In addition, the application protocol-specific serial port redirector 140 may facilitate limiting transmission of unnecessary control information over the network 160. In some example embodiments, using the application protocol-specific serial port redirector 140 may allow one of the plurality of serial devices 180 to supply data to a number of different applications 120 associated with different application protocols. Such necessity arises, for example, when the several applications 120 compete for connection with a single Point-of-Sale (POS) system and at least one of the applications 120 uses a different application protocol. More detailed explanations about a structure and functionality of the application protocol-specific serial port redirector 140 under these example embodiments are given below using FIGS. 3-6.

Figure 3:
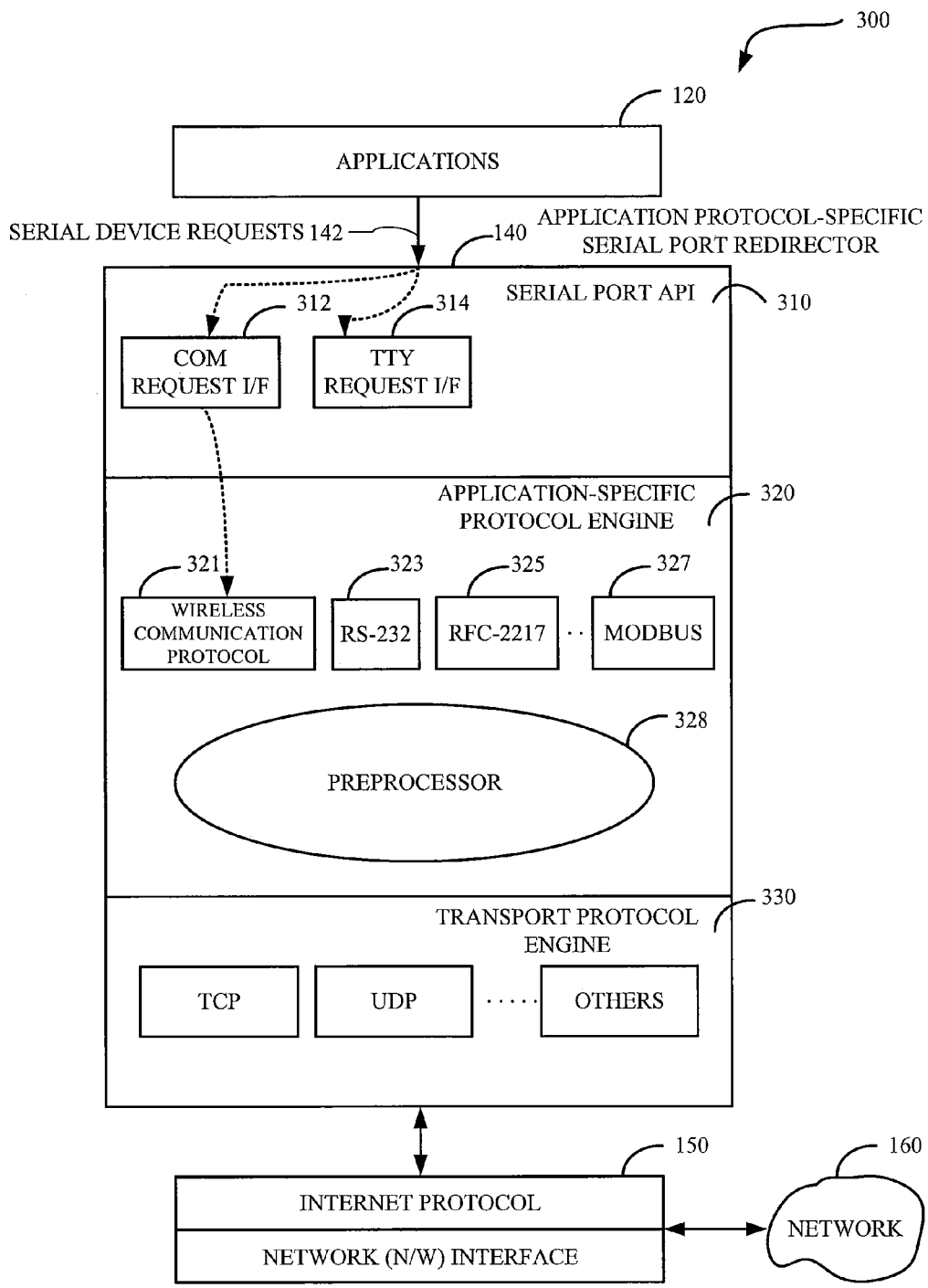
FIG. 3 is a block diagram of an application protocol-specific serial port redirector in more detail in accordance with an example embodiment.

FIG. 3 is a detailed block diagram of an application protocol-specific serial port redirector 300 in accordance with an example embodiment. Illustrated in FIG. 3 are one or more applications 120, the application protocol-specific serial port redirector 140 and the network interface 150. The application protocol-specific serial port redirector 140 may comprise a serial port application programming interface (API) 310, an application-specific protocol engine 320 and a transport protocol engine 330. The serial port API 310 may provide a plurality of serial port interfaces such as a COM request interface 312 and TTY request interface 314. These interfaces are host operating system specific and therefore mutually exclusive (COM on Microsoft Windows and TTY on Linux). In some example embodiments, one or more of different request interfaces may be employed in the serial port API 310 along with the COM request interface 312 and/or the TTY request interface 314.

One or more of the applications 120 (not shown in FIG. 3) running on the host computer 110 (not shown in FIG. 3) may generate one or more COM or TTY serial device requests 142 depending on an operating system of the host computer 110. The serial port API 310 may then receive the COM or TTY serial device requests 142 through the COM request interface 312 or TTY request interface 314. Each of the serial device request 142 may be associated with a specific application protocol, such as RFC-2217, Modbus or RS-232, and directed to one of the plurality of serial devices 180 (not shown in FIG. 3) over the network 160 (not shown in FIG. 3). Each of the serial device requests 142 may then be passed to the application-specific protocol engine 320 for further preprocessing according to the application protocol associated with the serial device request. The application protocols may include, but not limited to, RS-232, RFC-2217, Modbus ASCII, Modbus RTU, Allen-Bradley DF1, Omron Hostlink and custom protocols (e.g., NetCX as in RealPort product marketed by Applicant).

The application-specific protocol engine 320, operatively coupled to the serial port API 310, may have a preprocessor 328 and a plurality of application protocol modules 321, 323, 325 and 327. Each of the application protocol modules 321-327 may respond to one application protocol selected from a variety of application protocols. In some example embodiments, the application-specific protocol engine 320 may support automatic detection of an application protocol associated with the serial device request. To support this, the application-specific protocol engine 320 may identify an application that opens one of the plurality of serial port interfaces that receives the serial device request. In some example embodiments, a process handle may be used to identify a respective application opening a serial port interface if the respective application supports only a single protocol. By looking at information included in the handle, the application-specific protocol engine 320 may recognize that, for example, HyperTrm.exe opens \Device\Serial0 for COM1. In some example embodiments, the application-specific protocol engine 320 may provide a graphical user interface with which a user or administrator can manually configure the serial ports. A manual configuration of the serial ports may be done by protocol. For example, one or more of the serial ports may be configured to handle serial device requests for the Modbus ASCII protocol, whereas one or more other serial ports may be configured to handle serial device requests for Modbus RTU protocol. The manual configuration of the serial ports may also be done by application if a respective application supports only a single protocol, or by device which is attached to a virtual port corresponding to the serial device requested by the application. In some example embodiments, the application-specific protocol engine 320 may be configured to plug-in a new custom made protocol implemented by third parties.

When an application protocol is determined for a respective serial device request 142, the preprocessor 328 may then preprocess the respective serial device request locally using one of the application protocol modules 321-327 corresponding to the determined application protocol. For example, the preprocessor 328 may:

convert hardware flow control into software flow control (and vice versa);
remove individual or all modem signals change requests;
handle modem signals locally (for example, RTS/CTS), only providing a serial pipe to the device server;
cache information, not transmitting to device server;
spoof information to the application (for example, return last polling result);
process information asynchronously (for example, change a polling interval from 100 ms to 1 second to reduce network traffic);
encapsulate information into other protocols (for example, encapsulate a request into an XML element);
transform data for a different service (for example, take the data from the serial device requests 142 and make them available as a web service to other applications);
multiplex multiple Industrial Automation devices attached to different serial device servers on the network into one serial port;
packetize data after configurable conditions (for example, after a certain period of time, after a certain number of bytes have been received, when a specific delimiter is detected, etc.).

As illustrated above, depending on the application protocol, the local preprocessing of the serial device requests may allow control data associated with the application protocol to be consolidated into a single data packet before it is sent over the network. This may reduce the amount of control data being transferred over the network. The local preprocessing of the serial device requests may also allow the control data to be discarded if the control data is non-relevant information or, if appropriate, to be answered locally when the control data is a status or acknowledge message. This may result in no or reduced control data being sent over the network. If the serial device requests are preprocessed, the preprocessor 328 may forward the preprocessed serial device requests to the transport protocol engine 330 as a serial redirector message. In some example embodiments, the serial device request may be forwarded to the transport protocol engine without going through the preprocessing step.

In some example embodiments, the application-specific protocol engine 320 may further encrypt the serial redirector message before forwarding the serial redirector message to the transport protocol engine 330. Encrypting the serial redirector message is a security measure to maintain data integrity. In other words, the encrypted serial redirector message may prevent unauthorized changes in data including intentional destruction or alteration, tampering, duplication, or accidental loss, etc. The encrypted serial redirector message may also prevent disclosure to unauthorized individuals or processes. For example, encryption technology as in Encrypted RealPort product marketed by Applicant may be employed for such a purpose. In some example embodiments, the application-specific protocol engine 320 may have an application protocol module 321 that responds to a wireless communication protocol, such as ZigBee® protocol or IrDA®, to support access to one or more wireless serial devices over a wireless network.

The transport protocol engine 330, operatively coupled to the application-specific protocol engine 320, may associate the serial redirector message forwarded from the application-specific protocol engine 320 with a transport protocol to be used for transmission over the network. In some example embodiments, the transport protocol engine 330 may select the transport protocol from a variety of different transport protocols, including but not limited to TCP, UDP, IP, Telnet, SSH, SSL, HTTP or HTTPS, etc. For such a purpose, the transport protocol engine 330 may select, for each serial redirector message, a transport protocol that best serves the serial device request associated with the serial redirector message according to a specified configuration. In some example embodiments, the selection of a transport protocol may be made based on data type associated with the serial device requests. For example, TCP (Transmission Control Protocol) is better suited to transfer serial device request that needs a guaranteed delivery. This is because TCP offers error correction based on flow control. Flow control determines when data may need to be re-sent, and stop the flow of data until previous packets are successfully transferred. This works because if a packet of data is sent, a collision may occur. When this happens, the client re-requests the packet from the server until the whole packet is complete and is identical to its original. TCP is usually used to send important data such as web pages, database information, etc. UDP (User Datagram Protocol) is anther commonly used protocol on the Internet and is usually used to stream audio and video data. Streaming media data use UDP because it is faster than TCP. The reason UDP is faster than TCP is because there is no form of flow control or error correction. In contrast to TCP, however, the data sent over the Internet through UDP may be affected by collisions, and errors may result. In some example embodiments, the selection may be made based on pre-defined mapping between application protocols and transport protocols. For example, RFC-2217 to TCP, RS-232 to TCP and Modbus to UDP, etc. These two selecting methods based on the data type or the pre-defined mapping may be used alone or in combination with each other.

Figure 4:
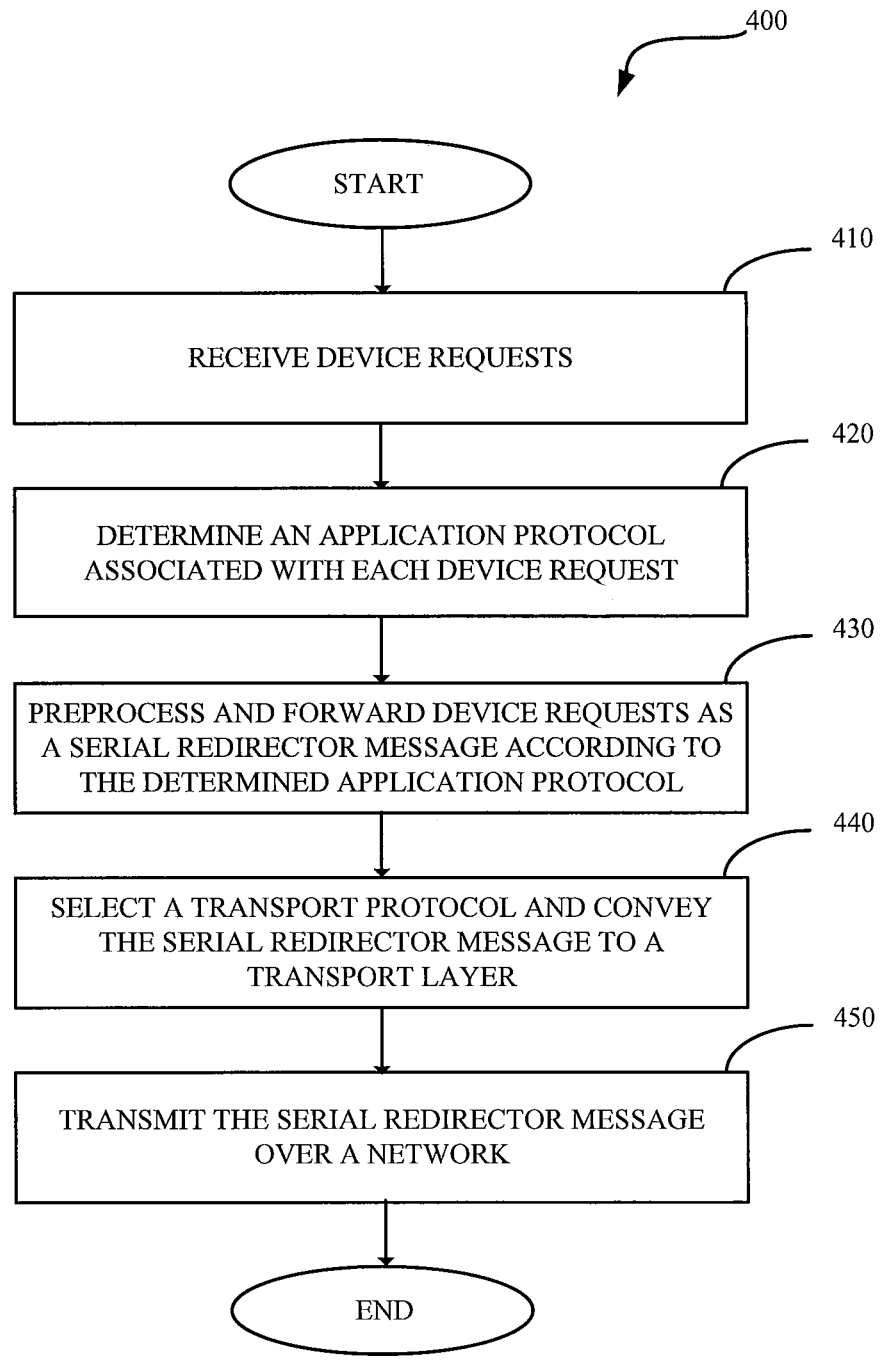
FIG. 4 is a flow chart of a method used to redirect serial device requests in accordance with an example embodiment.

FIG. 4 is a flow chart of a method used to redirect serial device requests 400 in accordance with an example embodiment. At operation 410, serial device requests (e.g., 142) may be received from one or more applications (e.g., 120) existing on a host computer (e.g., 110) through corresponding serial port interfaces (e.g., 312 & 314) of a serial port API (e.g., 310). A respective serial device request may be associated with a specific application protocol and directed to one of a plurality of serial devices (e.g., 180) over a network (e.g., 160). At operation 420, for the respective serial device request, an application protocol associated with the respective serial device request may be determined. As described above in FIG. 3, the determination (or detection) may be done automatically and/or manually for a plurality of application protocols including at least one of RS-232, RFC-2217, Modbus ASCII, Modbus RTU, Allen-Bradley DF1, Omron Hostlink and custom protocols (e.g., NetCX as in RealPort product marketed by Applicant). In some example embodiments, a plug-in module may be employed to accommodate a custom made application protocol.

At operation 430, the respective serial device request may be pre-processed into and forwarded as a serial redirector message according to the determined application protocol. As described above in FIG. 3, the preprocessing of the respective serial device request may include, for example, consolidating several units of information into a single packet. When pre-processed, the respective serial device request may then be forwarded as the serial redirector message. In some example embodiments, the serial device request may be forwarded to the transport protocol engine without going through the pre-processing step. At operation 440, the forwarded serial redirector message may then be associated with a transport protocol. As described above in FIG. 3, the association may include selecting a transport protocol that is best suited to transfer the serial redirector message over the network. The transport protocol to be associated with the serial redirector message may be selected according to the application protocol included in the serial redirector message from a group of transport protocols including at least two of TCP, UDP, IP, Telnet, SSH, SSL, HTTP or HTTPS, etc. Finally, at operation 450, the serial redirector message may be transmitted over the network as a function of the selected transport protocol.

In some example embodiments, the applications 120 may generate serial device requests directed to one or more universal serial bus (USB) ports. In such cases, the serial device requests may be received through an USB request interface provided in the serial port API 310. In some example embodiments, the serial redirector message may be encrypted before being forwarded to the transport layer. In some example embodiments, a wireless network may be provided in lieu of the network 160. In such cases, forwarding serial device requests may includes supporting a wireless communication protocol, such as ZigBee® or IrDA®, to enable access to one or more wireless serial devices over the wireless network.

Figure 5:
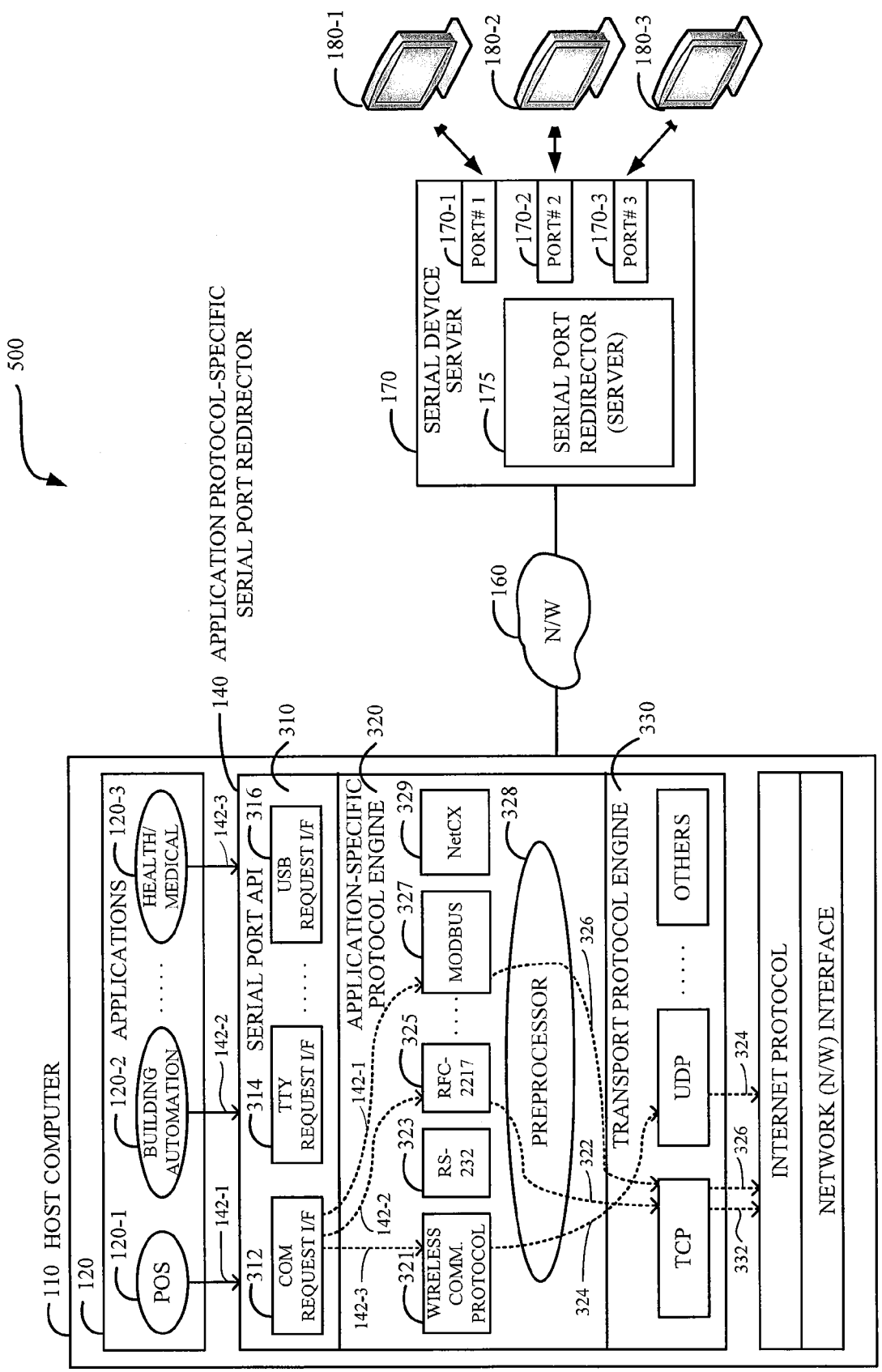
FIG. 5 is a block diagram of a computer system using an application protocol-specific serial port redirector in a network computing environment in more detail in accordance with an example embodiment.

FIG. 5 is a block diagram of a computer system 500 using the application protocol-specific serial port redirector in a network computing environment in more detail 500 in accordance with an example embodiment. The system may comprise one or more applications (e.g., 120-1, 120-2 and 120-3) on the host computer 110, wherein the one or more applications 120 may generate serial device requests 142. A respective serial device request may be directed to one of a plurality of serial devices (180-1, 180-2 and 180-3) connected to the host computer 110 via the network 160. The application protocol-specific serial port redirector 140 may be operatively coupled with the host computer 110 and include the serial port API 310, the application-specific protocol engine 320 and the transport protocol engine 330.

As an illustrative example, the one or more application programs 120 may generate three serial device requests (142-1, 142-2 and 142-3) directed to their corresponding serial devices (180-1, 180-2 and 180-3). These serial devices may be associated with RFC-2217, RS-232, and Modbus, respectively. When issued by the application programs 120, these serial device request may be received by the application protocol-specific serial port redirector 140 through the COM request interface 312 (e.g., for the Microsoft Windows operating system) of the serial port API 310. Then the preprocessor 328 of the application-specific protocol engine 320 may determine a related application protocol for each serial device request and preprocess the serial device request into a serial redirector message 322-326 using a corresponding application protocol module (e.g., 325, 321 or 327). In some example embodiments, the serial device request may be forwarded to the transport protocol engine without going through the pre-processing step.

When the serial redirector messages 322, 324, 326 are forwarded to the transport protocol engine 330, an appropriate transport protocol may be selected and associated with a respective serial redirector message. As described above in FIG. 3, the selection and association may be done according to, for example, a predefined mapping between application protocols and transport protocols (e.g., RS-232 to UDP; RFC-2217 to TCP; Modbus to TCP, etc.). Then the serial redirector message associated with wireless communication protocol 324 may be sent over the network 160 using UDP. On the other hand, the serial redirector messages associated with RFC-2217 and Modbus 322, 326 may be sent over the network 160 using TCP. When these serial redirector messages go through their associated transport protocols, additional header information corresponding to the transport protocols may be added to the serial redirector messages. When these serial device requests 322, 324 and 326 are received by the serial device server 170, they may be transferred to their corresponding serial devices (180-1, 180-2 and 180-3) through the corresponding communication lines provided by serial ports (170-1, 170-2 and 170-3) of the device server 170. In some example embodiments, the serial redirector messages associated with TCP 322 and 326 may be transferred to their respective serial devices over the network in one session. Such transfer of several serial device requests over a single TCP session is described in "Network Terminal Server with Full API Implementation," U.S. Pat. No. 6,047,319, the description of which is incorporated herein by reference.

In some example embodiments, the application protocol-specific serial port redirector 140 may be extended to handle serial device requests directed to a USB port. In such a case, the serial port API 310 may additionally provide one or more USB request interfaces 316 along with other serial device request interfaces (e.g., COM request interface 312 and TTY request interface 314). As an illustration, the serial port API 310 may receive from the applications 120 one or more serial device requests 142-4 directed to one or more USB ports through one or more of the USB request interfaces 316.

In some example embodiments, the application-specific protocol engine 320 may be configured to add a plug-in application protocol module to provide a serial device request interface associated with a new industry standard (e.g., RS-485) or custom-defined (e.g., NetCX as in RealPort product marketed by Applicant) application protocol. If a user needs to manage new serial devices that employ NetCX, the user may simply plug an application protocol module 329 for NetCX into the application-specific protocol engine 320 stack. This feature allows users to extend the functionality of the application protocol-specific serial port redirector 140 to new application protocols in the future.

According to some example embodiments as set forth above, Applicant's application protocol-specific serial port redirector 140 may support automatic and/or manual transition from one application and/or transport protocol to another application and/or transport protocol to efficiently service multiple serial device requests. In addition, the multi-stack structure of Applicant's application protocol-specific serial port redirector 140 may allow easy extension of functionality of the serial port redirector 140 to adapt new protocols including custom-made application protocols. In some example embodiments as set forth above, the local preprocessing of protocol control data by the application protocol-specific serial port redirector 140 may reduce the amount of data being transmitted over a network (e.g., possibly down to serial data only) depending on application and/or transport protocols. This may reduce a network cost, especially, in a wireless network that charges according to the amount of information being transferred over the network. Also, since the local preprocessing is done in a host computer, it may be possible to use serial port redirection technology (e.g., RealPort product marketed by Applicant) with less powerful, less expensive serial device/terminal servers in some example embodiment as set forth above. Furthermore, in some example embodiments as set forth above, using the application protocol-specific serial port redirector 140 above may allow a serial device to supply data to a number of different applications associated with different application protocols.

ADDITIONAL NOTES

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code may be tangibly stored on one or more volatile or non-volatile computer-readable media such as during execution or at other times. These computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above "DETAILED DESCRIPTION" includes references to the accompanying drawings, which form a part of the "DETAILED DESCRIPTION." The drawings show, by way of illustration, specific embodiments in which the invention can be practiced. These embodiments are also referred to herein as "examples." Such examples can include elements in addition to those shown and described. However, the present inventors also contemplate examples in which only those elements shown and described are provided.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Description of Example Embodiments, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Description of Example Embodiments, with each claim standing on its own as a separate embodiment.

What is claimed is:

1. A device for redirecting serial device requests from an application on a computer locally connected to the device to a plurality of serial devices connected to the computer via a network, wherein the computer includes a processor, the device comprising:
a serial port application programming interface (API), wherein the serial port API receives serial device requests from one or more applications existing on the computer, each serial device request being associated with a specific application protocol and directed to one of the plurality of serial devices over the network;
an application-specific protocol engine operating in the computer, connected to the serial port API and executing on the processor, wherein the application-specific protocol engine includes a plurality of application protocol modules, wherein each of the application protocol modules is configured to respond to a corresponding one of a plurality of application protocols, wherein the application-specific protocol engine determines, for each serial device request, an application protocol associated with the serial device request, selects an application protocol module from the application protocol modules as a function of the application protocol associated with the serial device request, and processes the serial device request to produce a serial redirector message using the selected application protocol module, and wherein the application-specific protocol engine consolidates application protocol data into a single data packet while processing the serial device request into the serial redirector message; and a transport protocol engine operating in the computer and connected to the application-specific protocol engine, wherein the transport protocol engine receives the serial redirector message forwarded from the application-specific engine and selects, for each serial redirector message, a transport protocol appropriate to transmit the serial redirector message over the network, wherein the transport protocol engine selects the transport protocol from a plurality of transport protocols and as a function of the application protocol.

2. The device of claim 1, wherein the serial port API receives serial device requests directed to one or more universal serial bus (USB) ports.

3. The device of claim 1, wherein the application-specific protocol engine supports two or more application protocols of RS-232, RFC-2217, Modbus ASCII, Modbus RTU and custom protocols.

4. The device of claim 1, wherein the application-specific protocol engine determines from the serial device request whether application protocol data may be discarded.

5. The device of claim 1, wherein the application-specific protocol engine checks status of the plurality of serial devices and provides the status in response to the serial device request as if the serial devices were attached to the application locally.

6. The device of claim 1, wherein the application-specific protocol engine encrypts the serial redirector message before forwarding the serial redirector message to the transport protocol engine.

7. The device of claim 1, wherein the application-specific protocol engine supports a wireless communication protocol for enabling access to one or more wireless serial devices over a wireless network.

8. The device of claim 1, wherein the application-specific protocol engine is configured to add one or more of the application protocol modules as plug-in modules, wherein each plug-in application protocol module provides an interface to serial device requests associated with a new application protocol including a custom-defined application protocol.

9. The device of claim 1, wherein the transport protocol selected for the serial redirector message comprises at least one of Transmission Control Protocol (TCP), User Datagram Protocol (UDP), Internet Protocol (IP), Telnet, Secure Shell (SSH), or Secure Socket Layer (SSL).

10. The device of claim 1, wherein the application protocol module transforms at least a portion of data in the serial device request from a first format associated with the application protocol to a second format associated with another application protocol.

11. The device of claim 1, wherein the serial redirector message includes data serviced by the application, wherein the transport protocol engine selects the transport protocol as a function of the data being transferred.

12. A method for redirecting serial device requests from an application on a computer to a plurality of serial devices connected to the computer via a network, wherein the computer includes a processor, the method comprising:

receiving serial device requests from one or more applications existing on the computer, each serial device request being associated with a specific application protocol and directed to one of the plurality of serial devices over the network;

determining, for each serial device request, an application protocol associated with the serial device request;

selecting, for the serial device request, an application protocol module from a plurality of application protocol modules as a function of the application protocol, wherein each of the application protocol modules is configured to respond to a corresponding one of a plurality of application protocols;

processing the serial device request to produce a serial redirector message using the selected application protocol module, wherein processing the serial device request includes consolidating control data associated with the determined application protocol into a single data packet;

selecting, for each serial redirector message, from a plurality of transport protocols and as a function of the application protocol, a transport protocol appropriate to transmit the serial redirector message over the network; and transmitting the serial redirector message over the network as a function of its associated transport protocol.

13. The method of claim 12, wherein processing includes supporting two or more application protocols of RS-232, RFC-2217, Modbus ASCII, Modbus RTU and custom protocols.

14. The method of claim 12, wherein processing includes checking from the serial device request whether control data associated with the determined application protocol may be discarded.

15. The method of claim 12, wherein processing includes checking status of the plurality of serial devices and providing the status in response to the serial device request as if the serial devices were attached to the one or more applications locally.

16. The method of claim 12, wherein processing includes encrypting the serial redirector message.

17. The method of claim 12, wherein processing includes supporting a wireless communication protocol for enabling access to one or more wireless serial devices over a wireless network.

18. The method of claim 12, wherein the transport protocol selected for the serial redirector message comprises at least one of TCP, UDP, IP, Telnet, SSH, or SSL.

19. A system for redirecting serial ports requests, comprising:

one or more applications located on a computer, wherein the one or more applications generate serial device requests and wherein the computer includes a processor;

a plurality of serial devices connected to the computer via a network; and an application protocol-specific serial port redirector locally connected to the computer, wherein the application protocol-specific serial port redirector includes:

a serial port application programming interface (API), wherein the serial port API receives the serial device requests generated from the one or more applications, each serial device request being associated with a specific application protocol and directed to one of the plurality of serial devices over the network;

an application-specific protocol engine operating in the computer, connected to the serial port API and executing on the processor, wherein the application-specific protocol engine includes a plurality of application protocol modules, wherein each of the application protocol modules is configured to respond to a corresponding one of a plurality of application protocols, wherein the application-specific protocol engine determines, for each serial device request, an application protocol associated with the serial device request, selects an application protocol module from the application protocol modules as a function of the application protocol associated with the serial device request, and processes the serial device request to produce a serial redirector message using the selected application protocol module, and wherein the application-specific protocol engine consolidates application protocol data into a single data packet while processing the serial device request into the serial redirector message; and a transport protocol engine operating in the computer and connected to the application-specific protocol engine, wherein the transport protocol engine receives the serial redirector message forwarded from the application-specific engine, selects, for each serial redirector message, a transport protocol appropriate to transmit the serial redirector message across the network, wherein the transport protocol engine selects the transport protocol from a plurality of transport protocols and as a function of the application protocol;

wherein each serial redirector message is transmitted to the directed serial device over the network as a function of its associated transport protocol.

20. The system of claim 19, wherein the application-specific protocol engine supports two or more application protocols of RS-232, RFC-2217, Modbus ASCII, Modbus RTU and custom protocols.

21. The system of claim 19, wherein the transport protocol selected for the serial redirector message comprises at least one of TCP, UDP, IP, Telnet, SSH, or SSL.

22. A non-transitory computer-readable storage device storing instructions that, when executed by a computer, cause the computer to perform operations comprising:

receiving serial device requests from one or more applications existing on the computer, each serial device request being associated with a specific application protocol and directed to one of a plurality of serial devices connected to the computer via a network;

determining, for each serial device request, an application protocol associated with the serial device request;

selecting, for the serial device request, an application protocol module from a plurality of application protocol modules as a function of the application protocol, wherein each of the application protocol modules is configured to respond to a corresponding one of a plurality of application protocols;

processing the serial device request to produce a serial redirector message using the selected application protocol module, wherein processing the serial device request includes consolidating control data associated with the determined application protocol into a single data packet;

selecting, for each serial redirector message, from a plurality of transport protocols and as a function of the application protocol, a transport protocol appropriate to transmit the serial redirector message over the network; and transmitting the serial redirector message over the network as a function of its associated transport protocol.

23. The storage device of claim 22, wherein determining includes supporting two or more application protocols of RS-232, RFC-2217, Modbus ASCII, Modbus RTU and custom protocols.

24. The storage device of claim 22, wherein the transport protocol selected for the serial redirector message comprises at least one of TCP, UDP, IP, Telnet, SSH, or SSL.

* * * * *